Figure 1:
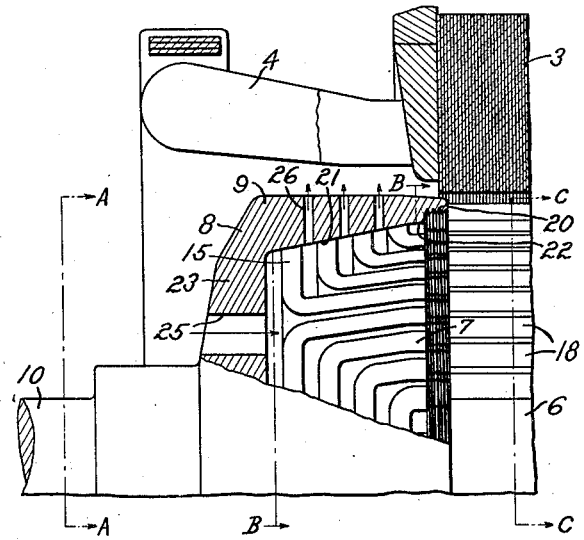

May 22, 1945.　　　　H. E. CRINER　　　　2,376,845
SMALL HIGH SPEED GENERATOR FIELD
Filed Jan. 28, 1943

WITNESSES:
Wm. B. Sellers.

INVENTOR
Harry E. Criner.
BY O. B. Buchanan
ATTORNEY

Patented May 22, 1945

2,376,845

UNITED STATES PATENT OFFICE 2,376,845

SMALL HIGH-SPEED GENERATOR FIELD

Harry E. Criner, Forest Hills, Pa., assignor to Westinghouse Electric & Manufacturing Company, East Pittsburgh, Pa., a corporation of Pennsylvania Application January 28, 1943, Serial No. 473,835

12 Claims. (Cl. 171—252)

My invention relates to the rotating field-member of a synchronous generator or motor, and it has particular relation to such machines having a small diameter and operating at a very high speed, and utilizing a maximum of light-weight metals. My invention was designed for, and is particularly advantageous in, a four-pole machine, but some of its design-principles are applicable also in synchronous machines having two poles or more than four poles. My invention is particularly applicable to synchronous generators or motors having a phenomenally light weight per horsepower, such as are adapted to be utilized for the transmission of the propulsion-power from the engine to the propellers, on airplanes, as generically designed and claimed in a copending application of Lee A. Kilgore, Frank W. Godsey, Jr., Bennie A. Rose, and Frank B. Powers, Serial No. 474,474, filed February 2, 1943, for Electrical airplane-propulsion, assigned to the Westinghouse Electric & Manufacturing Company.

The principal object of my invention is to provide a novel slot-arrangement and mechanical construction of a generator-field, particularly a four-pole field, or a field having more than two poles, although the invention could be utilized with a two-pole field.

Heretofore, in two-pole generator-fields, a slot-arrangement has been known, in which parallel winding-receiving slots were milled both axially, along opposite sides of the cylindrical surface of the rotor-member, and transversely across the end-surfaces of the rotor-member, as shown in Patent No. 959,651, granted May 31, 1910 to E. M. Tingley, and assigned to the Westinghouse Electric & Manufacturing Company. This Tingley type of construction could not be utilized in rotors having more than two poles, and it also involved an excessive amount of weight, because the heavy steel or other magnetizable material had to be extended end-wise far enough to enclose the end-winding connections of the rotor-member.

As explained in the copending Kilgore et al. application, the achievement of a light-weight construction, in a generator weighing 0.3 pound per horsepower in a 2000-horsepower size, necessitates not only an extremely high speed, which may be of the order of 15,000 revolutions per minute, more or less, or a peripheral rotor-speed approaching of speed of sound in the air of the density at which the machine is to operate, but it also entails the reduction of the weight of the rotor-member to an absolute minimum, by resorting to the use of special light-weight materials, such as forged aluminum or one of the magnesium alloys, wherever possible, confining the use of magnetizable materials strictly to just the parts which are required to carry flux, using special light-weight slot-wedges for resisting the high centrifugal forces, utilizing special inorganic insulating-materials, such as the newly developed silicones, which will allow the operating-temperatures to be raised to the order of 200° C. in order to bring the weight down, the use of special magnetizable material which can be worked very hard magnetically, the use of special high-alloy steels having the necessary mechanical strength to withstand the high speeds of operation, and various other expedients.

My present invention relates to a special rotor-field construction in which the use of magnetizable material is confined essentially to a cylindrical rotor-core having the minimum axial length necessary to carry the flux, and having four groups of parallel winding-carrying slots of graduated depths (in case of a four-pole construction), in combination with a combined retaining-ring and shaft-end which is provided in the form of a special end-head of light-weight material which is secured onto the end of the magnetizable core-member in such manner as to both retain the end-winding connections against centrifugal force and provide a shaft-extension for that end of the rotor-member.

Figure 2:
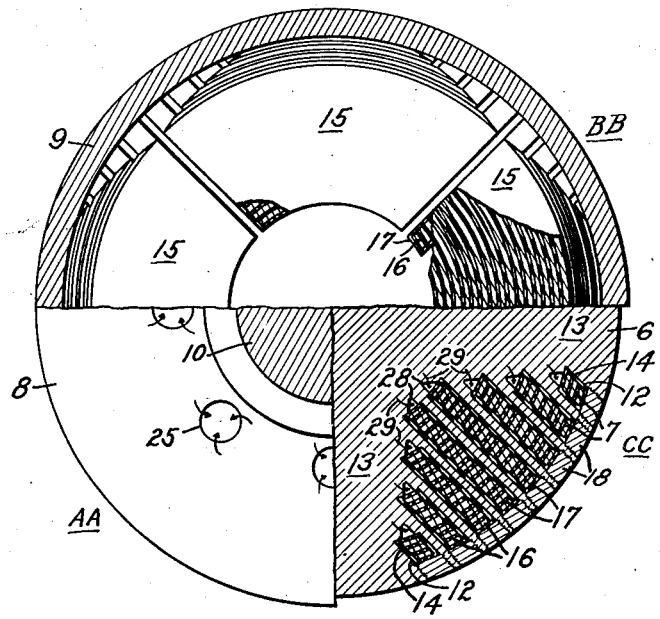

With the foregoing and other objects in view, my invention consists in the apparatus, combinations, parts, and methods hereinafter described and claimed, and illustrated in the accompanying drawing, wherein:

Figure 1 is a fragmentary longitudinal view of a portion of a polyphase synchronous machine embodying my invention, with the rotor-member shown in elevation, with parts broken away to illustrate the construction; and Fig. 2 is an end view of the rotor-member, with parts broken away on successive planes, as indicated by the lines A—A, B—B and C—C in Fig. 1.

My invention is illustrated in connection with a 15,000-R. P. M., 500-cycle, four-pole, three-phase synchronous generator or motor of the light-weight type previously described, and comprising a stationary primary member 3, having a three-phase primary winding 4; and a high speed rotor field-member having a magnetizable cylindrical core 6, field windings 7, and a light-weight end-head 8 having a retaining-ring portion 9 and a shaft-extension portion 10. As shown in Fig. 2, the cylindrical surface of the rotor-core 6, which is of a good magnetic steel, is provided with axially extending parallel winding-receiving slots 12 disposed in four groups, or as many groups as there are poles, and having graduated depths so as to provide the maximum winding-carrying slot-space commensurate with the provision of just the required cross-section of steel for the conduction of the magnetic flux in the four field-poles 13.

The field-winding 7 consists of coil-sides 14 lying within the several slots 12, and end-winding connections 15 which are disposed within the retaining-ring portion 9 of the end-head 8, at each end of the machine. The field-winding 7 is preferably made up of pre-formed coils of strap-conductors 16 separated by insulating material 17. The coil-sides 14 are retained in the slots 12 by means of slot-closing wedges 18 of a suitable light-weight material, such as aluminum or magnesium.

As shown in the drawing, half of the coil-sides 14 lying in each of the four groups of parallel slots 12 have end-winding portions which are bent edgewise with respect to the strap-conductor, to pass in one direction circumferentially around a quarter of the end-winding space, to encircle one of the adjacent poles 13, while the other half of the coil-sides 14 of that group pass in the opposite direction circumferentially around a quarter of the end of the core so as to embrace the other pole 13 bounding said group of parallel coil-sides 14.

Preferably, also, the retaining-ring part 9 of the end-head 8 is of tapered thickness, being thinnest at the point 20 where it is screwed onto, or otherwise fastened to, the end of the magnetizable core 6. The inner surface 21 of the retaining-ring portion 9 is thus conical-shaped, and hence it is necessary for the coil-sides 14, which extend out beyond the core 6 and merge into the end-winding connections 15, to be bent conically inwardly to conform to the conical inner surface 21 of the retaining-ring portion 9 of the end-head 8. Thus the retaining-ring portion 9 is thickest at the point where it joins onto the radial disc-portion 23 which joins the retaining-ring portion 9 to the shaft-extension 10 of the end-head 8. It will be understood that the entire end-head 8 is made of a single integral piece of metal, which has ample mechanical strength, by reason of its integral disc-portion 23, notwithstanding the fact that its material of construction may not be as strong, mechanically, as steel or other materials which are noted for their great strength.

Ventilation may be provided by means of a series of axially extending holes 25 in the disc-portion 23 of the end-head 8, and by a series of radial ventilating holes 26 in the retainer-ring portion 9 of the end-head 8. The particular arrangement of parallel winding-receiving slots 12 of graduated depths is also conducive to the provision of triangular ventilating slot-extensions 28 (Fig. 2) at the inner ends or bottoms of the slots, beneath the coil-sides 14 of the winding, thus providing ventilating-slots 28 through which ventilating-air may be passed, as shown by the arrows 29, to provide additional cooling for the bottoms of the coil-sides lying in the slots 12. It will be noted that these triangular-sectioned ventilating-slots 28 are provided, without detracting from the cross-sectional area of the magnetic path for the several poles 13 of the rotor-member.

The rotor-construction which I have illustrated is primarily, although not exclusively, suitable for small-diameter rotors, perhaps up to 10 inches or 12 inches, running at very high speeds, perhaps speeds in excess of 6000 revolutions per minute, and less than something like 21,000 revolutions per minute, corresponding to a frequency-range between 200 and 700 cycles per second, in a four-pole design. In such high-speed designs, it is very essential that the weight of the rotor-member be kept to the minimum possible value, which means that the magnetizable rotor core 6 must be limited to the minimum possible axial length, and that a special light-weight material must be utilized for the end-heads 8, such a material being a forged aluminum member or a member made from one of the light alloys containing magnesium or other light metals. My end-head construction provides an integral-disc construction which is inherently strong, thus providing the necessary mechanical strength, even with a relatively weak material.

Aside from the high-speed light-weight application of my invention, certain phases of my invention are of generic application to multi-polar rotor-constructions in general, where the number of poles is in excess of two, and where previous parallel-slot rotor-constructions have not been available for more than two poles. My use of parallel winding-slots 12 of varying depths makes it possible for me to place a maximum of conductor-material 16 in the slots, while still obtaining just the required cross-section of steel for the conduction of the magnetic fluxes in the respective poles 13.

While I have illustrated my invention in a single preferred form of construction, I wish it to be understood that the invention is susceptible of embodiment in a number of different forms. I desire, therefore, that the appended claims be accorded the broadest construction consistent with their language.

I claim as my invention:

1. A synchronous dynamo-electric machine comprising a primary stator-member and a rotor field-member, characterized by said field-member comprising a cylindrical rotor-core having a plurality of groups of substantially parallel, axially extending, winding-carrying slots of varying depths in its cylindrical surface, a field-winding having coil-sides lying in said slots and having end-winding portions comprising extensions of said coil-sides extending beyond the ends of said core and bent to extend in a circular direction to the next group of substantially parallel core-slots, half of the coil-side extensions of each group bending circumferentially in one direction, and half in the other direction, and two separate end-heads each comprising a retainer-ring portion secured to its end of the rotor-core and serving to retain the end-winding portions against centrifugal force, each end-head further comprising a shaft-end and an intermediate disc-portion joining the shaft-end and the retainer-ring portion.

2. A synchronous dynamo-electric machine comprising a primary stator-member and a rotor field-member, characterized by said field-member comprising a cylindrical rotor-core having more than two poles and having, between each pair of poles, in its cylindrical surface, a group of substantially parallel, axially extending, winding-carrying slots of varying depths such as to provide the maximum winding-carrying space commensurate with the necessary flux-carrying cross-sections of the several poles, a field-winding having coil-sides lying in said slots and having end-winding portions comprising extensions of said coil-sides extending beyond the ends of said core and bent to extend in a circular direction to the next group of substantially parallel core-slots, half of the coil-side extensions of each group bending circumferentially in one direction, and half in the other direction, and two separate end-heads each comprising a retainer-ring portion secured to its end of the rotor-core and serving to retain the end-winding portions against centrifugal force, each end-head further comprising a shaft-end and an intermediate disc-portion joining the shaft-end and the retainer-ring portion.

3. A high-speed light-weight synchronous dynamo-electric machine comprising a primary member and a field-member, the latter rotating at a speed higher than 6,000 revolutions per minute, characterized by said field-member comprising a magnetizable cylindrical rotor-core having a plurality of groups of substantially parallel, axially extending, winding-carrying slots of varying depths in its cylindrical surface, a field-winding having coil-sides lying in said slots and having end-winding portions comprising extensions of said coil-sides extending beyond the ends of said core and bent to extend in a circular direction to the next group of substantially parallel core-slots, half of the coil-side extensions of each group bending circumferentially in one direction, and half in the other direction, and two separate end-heads of a light-weight metal, each comprising a retainer-ring portion secured to its end of the rotor-core and serving to retain the end-winding portions against centrifugal force, each end-head further comprising a shaft-end and an intermediate disc-portion joining the shaft-end and the retainer-ring portion.

4. A high-speed light-weight synchronous dynamo-electric machine comprising a primary member and a field-member, the latter rotating at a speed higher than 6,000 revolutions per minute, characterized by said field-member comprising a magnetizable cylindrical rotor-core having more than two poles and having, between each pair of poles, in its cylindrical surface, a group of substantially parallel, axially extending, winding-carrying slots of varying depths such as to provide the maximum winding-carrying space commensurate with the necessary flux-carrying cross-sections of the several poles, a field-winding having coil-sides lying in said slots and having end-winding portions comprising extensions of said coil-sides extending beyond the ends of said core and bent to extend in a circular direction to the next group of substantially parallel core-slots, half of the coil-side extensions of each group bending circumferentially in one direction, and half in the other direction, and two separate end-heads of a light-weight metal, each comprising a retainer-ring portion secured to its end of the rotor-core and serving to retain the end-winding portions against centrifugal force, each end-head further comprising a shaft-end and an intermediate disc-portion joining the shaft-end and the retainer-ring portion.

5. The invention as defined in claim 1, characterized by the inner surface of each retainer-ring portion being conical, and the coil-side extensions being bent to conform to said inner conical surfaces, the retainer-ring portion being thickest radially at the end adjoining the disc-portion.

6. The invention as defined in claim 2, characterized by the inner surface of each retainer-ring portion being conical, and the coil-side extensions being bent to conform to said inner conical surfaces, the retainer-ring portion being thickest radially at the end adjoining the disc-portion.

7. The invention as defined in claim 3, characterized by the inner surface of each retainer-ring portion being conical, and the coil-side extensions being bent to conform to said inner conical surfaces, the retainer-ring portion being thickest radially at the end adjoining the disc-portion.

8. The invention as defined in claim 4, characterized by the inner surface of each retainer-ring portion being conical, and the coil-side extensions being bent to conform to said inner conical surfaces, the retainer-ring portion being thickest radially at the end adjoining the disc-portion.

9. The invention as defined in claim 1, characterized by the field-winding comprising preformed coils of strap-conductors.

10. The invention as defined in claim 2, characterized by the field-winding comprising preformed coils of strap-conductors.

11. The invention as defined in claim 3, characterized by the field-winding comprising preformed coils of strap-conductors.

12. The invention as defined in claim 4, characterized by the field-winding comprising preformed coils of strap-conductors.

HARRY E. CRINER.